(12) United States Patent
Wilson et al.

(10) Patent No.: US 11,002,066 B2
(45) Date of Patent: May 11, 2021

(54) SYSTEMS WITH DYNAMIC PIXELATED WINDOWS

(71) Applicant: Apple Inc., Cupertino, CA (US)

(72) Inventors: James R. Wilson, Cupertino, CA (US); Martin Melcher, Mountain View, CA (US); Christopher D. Jones, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/403,395

(22) Filed: May 3, 2019

(65) Prior Publication Data

US 2019/0383091 A1 Dec. 19, 2019

Related U.S. Application Data

(60) Provisional application No. 62/687,181, filed on Jun. 19, 2018.

(51) Int. Cl.
| | |
|---|---|
| *G02F 1/137* | (2006.01) |
| *E06B 9/24* | (2006.01) |
| *G06F 3/01* | (2006.01) |
| *G09G 5/10* | (2006.01) |
| *B60J 3/04* | (2006.01) |

(52) U.S. Cl.
CPC .................. *E06B 9/24* (2013.01); *B60J 3/04* (2013.01); *G02F 1/13725* (2013.01); *G06F 3/017* (2013.01); *G09G 5/10* (2013.01); *E06B 2009/2417* (2013.01); *E06B 2009/2464* (2013.01); *G09G 2354/00* (2013.01); *G09G 2380/10* (2013.01)

(58) Field of Classification Search
CPC ................................... E06B 9/24; G06F 3/017
See application file for complete search history.

(56) References Cited

U.S. PATENT DOCUMENTS

| | | | |
|---|---|---|---|
| 6,580,472 | B1 | 6/2003 | Willingham et al. |
| 7,791,785 | B2 | 9/2010 | Knafou et al. |
| 8,606,430 | B2 | 12/2013 | Seder et al. |
| 10,488,686 | B1* | 11/2019 | Melcher .................. G02F 1/133 |
| 2006/0208169 | A1* | 9/2006 | Breed ................. G06K 9/00624 250/221 |
| 2007/0222252 | A1 | 9/2007 | Suzuki et al. |
| 2009/0027759 | A1 | 1/2009 | Albahri |

(Continued)

*Primary Examiner* — Sang V Nguyen
(74) *Attorney, Agent, or Firm* — Treyz Law Group, P.C.; G. Victor Treyz; Kendall W. Abbasi

(57) ABSTRACT

A system such as a vehicle system or building system may have an enclosing structure such as a wall that surrounds an interior region and separates the interior region from an exterior region. An occupant of the system may be located in the interior region. An adjustable window in the enclosing structure may be located between the interior and exterior regions. Control circuitry in the system may use an exterior sensor system in the exterior region to capture an image of the environment surrounding the system, to locate external objects such as light sources, and to make other measurements. User input can be gathered from the occupant of the system and the location of the occupant and inanimate objects in the interior region can be gathered using an interior sensor system. The control circuitry can adjust the window based on the gathered information.

21 Claims, 7 Drawing Sheets

(56) References Cited

U.S. PATENT DOCUMENTS

| | | | |
|---|---|---|---|
| 2009/0058126 A1* | 3/2009 | Broude | B60J 3/04 296/97.2 |
| 2010/0094501 A1 | 4/2010 | Kwok | |
| 2011/0163866 A1 | 7/2011 | Ghannam et al. | |
| 2012/0262673 A1 | 10/2012 | Larsson | |
| 2015/0309316 A1* | 10/2015 | Osterhout | G06F 1/163 345/8 |
| 2017/0219859 A1* | 8/2017 | Christophy | G02F 1/29 |
| 2018/0001903 A1* | 1/2018 | Nagy | B60W 30/09 |
| 2018/0304727 A1* | 10/2018 | Choi | B60R 16/037 |
| 2019/0179275 A1* | 6/2019 | Berman | E06B 9/24 |
| 2019/0197323 A1* | 6/2019 | Sakai | G06K 9/6261 |

\* cited by examiner under the dark or opaque regions) and the dark regions (sometimes referred to as transparent regions or clear regions). The adjustable window may also

SYSTEMS WITH DYNAMIC PIXELATED WINDOWS

This application claims the benefit of provisional patent application No. 62/687,181, filed Jun. 19, 2018, which is hereby incorporated by reference herein in its entirety.

FIELD

This relates generally to systems such as vehicle and building systems and, more particularly, to systems with windows.

BACKGROUND

Buildings, vehicles such as automobiles, boats, and planes, and other systems may have windows. Window blinds may be used to control sunlight and maintain a desired degree of privacy. In some systems, electronically adjustable windows are used. For example, a vehicle may be provided with electrochromic window tinting that allows the windows of the vehicle to be turned clear or dark. Systems such as these may be used to make adjustments to the amount of light entering the vehicle, but can be inflexible and difficult to control.

SUMMARY

A system such as a vehicle system or building system may have an enclosing structure such as a vehicle body or other wall structure that surrounds an interior region and separates the interior region from an exterior region. An occupant of the system may be located in the interior region. Inanimate objects may also be located in the interior region. Light sources and other objects may be located in the exterior region.

An adjustable window in the enclosing structure may be located between the interior and exterior regions. Control circuitry in the system may use an exterior sensor system in the exterior region to capture an image of the environment surrounding the system, to locate external objects such as light sources, and to make other environmental measurements. Using an interior sensor system, the control circuitry can gather user input from the occupant of the system and can determine the location of the occupant and inanimate objects in the interior region.

The adjustable window may be pixelated, allowing optical characteristics of different regions of the adjustable window to be adjusted differently. During operation of the system, the control circuitry may adjust the window in response to sensor data and other input. Light transmission, reflectivity, absorption, haze, color, and other optical characteristics can be adjusted.

DETAILED DESCRIPTION

Electronic equipment may be provided with an adjustable window. The adjustable window may be formed in a building, vehicle, or other system. The adjustable window may have an adjustable transparency. For example, the adjustable window may be configured to have one or more darkened regions (sometimes referred to as dark or opaque regions) and one or more regions that are more transparent than the darkened regions (sometimes referred to as transparent regions or clear regions). The adjustable window may also exhibit adjustable light reflection, light absorption, color, haze, and other adjustable optical characteristics.

The adjustable window may be pixelated so that light transmission and other characteristics can be adjusted differently in different portions of the window. For example, the adjustable window may be used to dynamically adjust the locations of dark and transparent regions. If desired, dark regions may be placed in locations where the dark regions block undesired light. This allows shadows to be formed in the interior of the system. A shadow may, for example, be placed over the eyes of a user of the system (e.g., a system occupant such as a vehicle occupant) to protect the user from glare or may be placed over the face or body of a user to enhance comfort by reducing heating from the sun. Transparent regions may be created to produce desired illuminated regions within the interior of the system. These regions, which may sometimes referred to as spotlight regions, may be surrounded by shadows and may help visually highlight objects of interest such as books or other inanimate objects in an interior region of a vehicle or other system.

Environmental data, user input, data from interior and exterior sensor systems, and other information may be used in determining how to adjust the adjustable window. For example, if oncoming headlights are identified in front of a vehicle, a darkened window region may be used to shadow the eyes of a user in the vehicle, so that the user is not blinded by the headlights. As another example, darkened regions may be dynamically positioned to shade the skin of a user's face or other portions of a user's body from the sun. In some arrangements, a window may be darkened in all but a selected transparent region to allow a beam of sunlight (e.g., spotlight illumination) to enter into the system interior. Dark and transparent areas in an adjustable window may also be configured to block undesirable exterior surroundings from view by a user in the interior of the system. Window adjustments may also be used to create desired privacy within a system interior.

Figure 1:
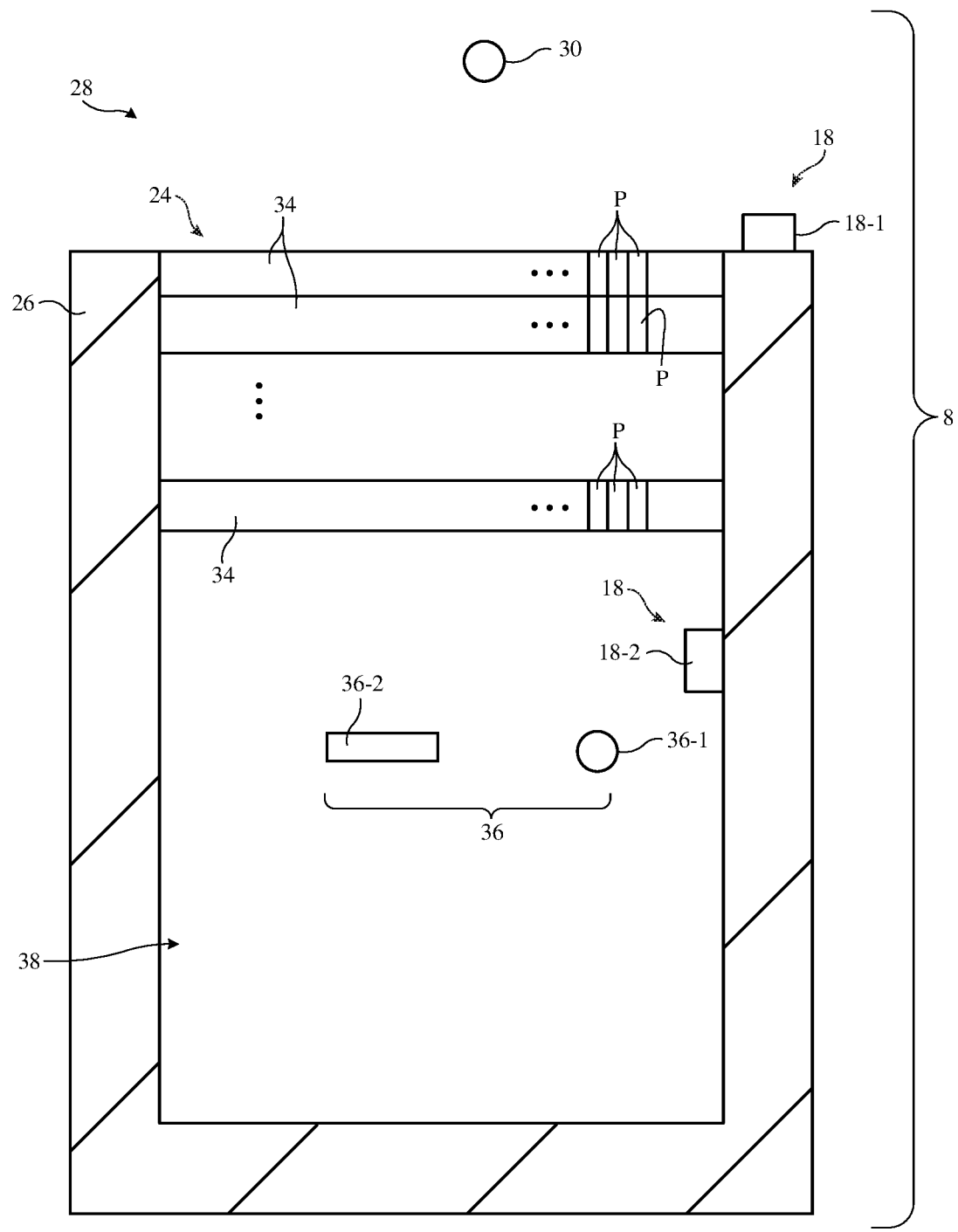
FIG. 1 is a diagram of an illustrative system with an adjustable window in accordance with an embodiment.

An illustrative system of the type that may include an adjustable window is shown in FIG. 1. As shown in FIG. 1, system 8 may include wall structure 26. Wall structure 26, which may sometimes be referred to as a body structure, wall, enclosing structure, etc., may form a wall in a building, a wall in a vehicle body (e.g., a body panel, door, floor structure, and/or roof structure), or other enclosing structures for system 8 that separate a first region (e.g., an interior region such as system interior 38) from a second region (e.g., an exterior region such as system exterior 28). One or more windows such as adjustable window 24 may be supported by wall structure 26. For example, a vehicle may have front, rear, roof, and/or side windows in an enclosing structure such as a vehicle body, a building may have exterior and/or interior windows in an enclosing structure such as a building wall, and/or other systems may have windows.

External objects such as external object 30 may be located in exterior region 28. External objects such as object 30 may include light sources (e.g., the sun, street lights, vehicle headlights, etc.), may include shiny objects that serve as light sources (e.g., shiny metal objects or other objects characterize by specular light reflection, sometimes referred to as specular reflectors), may include objects that are pleasant to view (e.g., trees, mountains, clouds, and/or other items that an occupant within the interior of system 8 desires to view), may include objects that are unpleasant to view (e.g., billboards, industrial buildings, power lines, and/or other items that the occupant within system 8 does not desire to view), may include people (e.g., pedestrians, drivers of vehicles, people in buildings, etc.), and/or other external objects 30.

Interior objects may be located in the interior of system 8. For example, interior objects 36 may be located in interior region 38. Interior objects 36 may include objects such as object 36-1 (e.g., one or more people, sometimes referred to as system users, system occupants, vehicle occupants, building occupants, etc.). Interior objects 36 may also include inanimate objects such as object 36-2. Object 36-2 may be a book or other item with text, an electronic device (e.g., a portable electronic device such as a tablet computer, laptop computer, cellular telephone, etc.), a non-electronic item, and/or other interior object.

System circuitry may be supported by structure 26. For example, system 8 may include sensors (sensor systems) 18 that gather sensor measurements on interior 38 (see, e.g., interior sensor 18-2) and/or that gather sensor measurements on exterior 28 (see, e.g., exterior sensor 18-1). Sensors 18 may gather information on the location of objects relative to system 8 (e.g., relative to structure 26). For example, sensor 18-1 may gather information on the location of objects such as external object 30 relative to structure 26 and sensor 18-2 may gather information on the location of objects such as internal objects 36 relative to structure 26. Using this information, control circuitry in system 8 can make adjustments to adjustable window 24. For example, the light transmission of different regions of adjustable window 24 can be adjusted. With these adjustments, glare can be blocked, shadows can be placed on desired locations in interior 38, the ability to view various portions of exterior region 28 from interior region 38 can be adjusted, the ability to view various portions of interior region 38 from exterior region 28 can be adjusted, and/or other adjustments can be made to window 24. In making adjustments to window 24, one or more portions of window 24 can be adjusted. For example, the optical characteristics of different regions of window 24 can be adjusted differently.

Window 24 may include one or more layers 34. Layers 34 may include one or more layers that exhibit fixed optical properties (e.g., one or more layers characterized by fixed amounts of light transmission, light reflectivity, and light absorption, fixed color cast, fixed polarization, fixed haze, etc.). Examples of layers that exhibit fixed optical properties include transparent or colored layers of glass or polymer (e.g., substrate layers, coatings, etc.), thin metal layers (e.g., partially reflective metal layers), thin-film interference filters formed from stacks of dielectric (e.g., organic or inorganic layers of alternating refractive index values configured to form bandpass filters, band-stop filters, low pass filters, high pass filters, mirrors, etc.), fixed wire-grid polarizers, fixed polarizers based on polyvinyl alcohol impregnated with iodine, or other polarizers, diffuser layers (e.g., polymer layers with embedded light scattering structures such as textured surfaces and/or embedded particles with refractive index values that differ from surrounding polymer), and/or other fixed layers.

Layers 34 may also include one or more electrically adjustable optical layers. Electrically adjustable optical layers in window 24 may include layers that exhibit adjustable amounts of light transmission, light absorption, light reflectivity, color cast, haze, polarization, and other optical properties. Examples of electrically adjustable optical layers include liquid crystal layers such as guest host liquid crystal devices, liquid crystal devices with polarizers, and cholesteric liquid crystal layers, electrochromic layers, suspended particle devices, electrophoretic devices, electrowetting devices, polymer dispersed liquid crystal layers, and/or other adjustable devices that exhibit adjustable optical properties such as haze, color, light reflection, light absorption, and/or light transmission.

In some arrangements, an electrically adjustable layer may be used to adjust multiple optical properties simultaneously. For example, a guest-host liquid crystal layer may be adjusted to alter light transmission. During these adjustments, light absorption, light reflection and the color cast of transmitted light may be affected.

As another example, consider a scenario in which light transmission is being adjusted using a suspended particle device. A suspended particle device contains a layer of nanoparticles suspended in a liquid that is sandwiched between substrate layers with transparent conductive electrodes. In the absence of an applied electric field, the nanoparticles are randomly oriented and absorb light (i.e., the layer is dark and the light transmission of the layer is low). When an electric field is applied, the nanoparticles align and allow light to pass (i.e., the layer appears clear and light transmission is high). In addition to allowing an adjustable light transmission to be obtained, suspended particle devices are characterized by an associated adjustable haze (e.g., a 6% haze when the suspended particle device is off and is exhibiting a low amount of light absorption and a 50% haze when the suspended particle device is on and is exhibiting a high amount of light absorption). In this way, a suspended particle device may serve both as an adjustable light transmission layer and as an adjustable haze layer.

Other electrically adjustable layers in window 24 may also exhibit multiple optical characteristics that change. For example, adjustment of an electrochromic layer may adjust the color cast and light transmission of the layer. Adjustment of a cholesteric liquid crystal layer that is serving as an adjustable mirror may affect light transmission as well as reflectivity, etc. In some arrangements, adjustable window 24 may contain a single adjustable layer (e.g., a layer that serves primarily as an adjustable light transmission layer). In other arrangements, adjustable window 24 may contain multiple adjustable layers (e.g., a first layer for adjusting light transmission, a second layer for adjusting haze, a third layer for adjusting reflectivity, etc.). In general, any suitable number of fixed and/or adjustable optical layers 34 may be included in adjustable window 24 and may be electrically controlled by control circuitry in system 8. Each layer 34 may be controlled individually or sets of two or more layers 34 or all of layers 34 may be adjusted together.

The structures of one or more of layers 34 may be pixelated, as indicated by illustrative pixels P of layers 34. For example, one or more of layers 34 may have pixels formed from individually adjustable electrodes (e.g., electrodes formed from transparent conductive materials such as indium tin oxide). Electrodes and other pixel structures for pixels P may have any suitable shapes and may be adjusted individually. For example, electrodes and other structures may be rectangular or square and may be patterned in an array having any suitable number N1 of rows and any suitable number N2 of columns. The values of N1 and N2 may be, for example, at least five, at least ten, at least 100, at least 500, less than 5000, less than 1000, less than 400, less than 120, less than 40, less than 20, or other suitable values. If desired, electrodes and other structures for pixels P may have elongated strip shapes and may extend across some or all of the surface of window 24. Global electrodes (e.g., ground planes) may also be used (e.g., in combination with pixelated electrodes).

During operation of system 8, control circuitry in system 8 may apply adjustable signals (e.g., voltages) to pixels P to selectively adjust the optical properties of particular regions of window 24. For example, a first signal may be applied to a first set of pixels P to provide a first associated region of window 24 with a first set of optical properties (e.g., a first light transmission value, a first reflectivity, a first light absorption value, a first haze value, and a first color cast), a second signal may be applied to a second set of pixels P to provide a second associated region of window 24 with a second set of optical properties (e.g., a second light transmission value, a second reflectivity, a second light absorption value, a second haze value, and a second color cast), etc.

Due to the presence of pixelated structures in adjustable window 24, control circuitry in system 8 may make global adjustments to window 24 and/or localized (spatially distinct) adjustments to window 24. For example, light transmission, haze, and/or other optical characteristics may be adjusted by different amounts in different areas of window 24.

Figure 2:
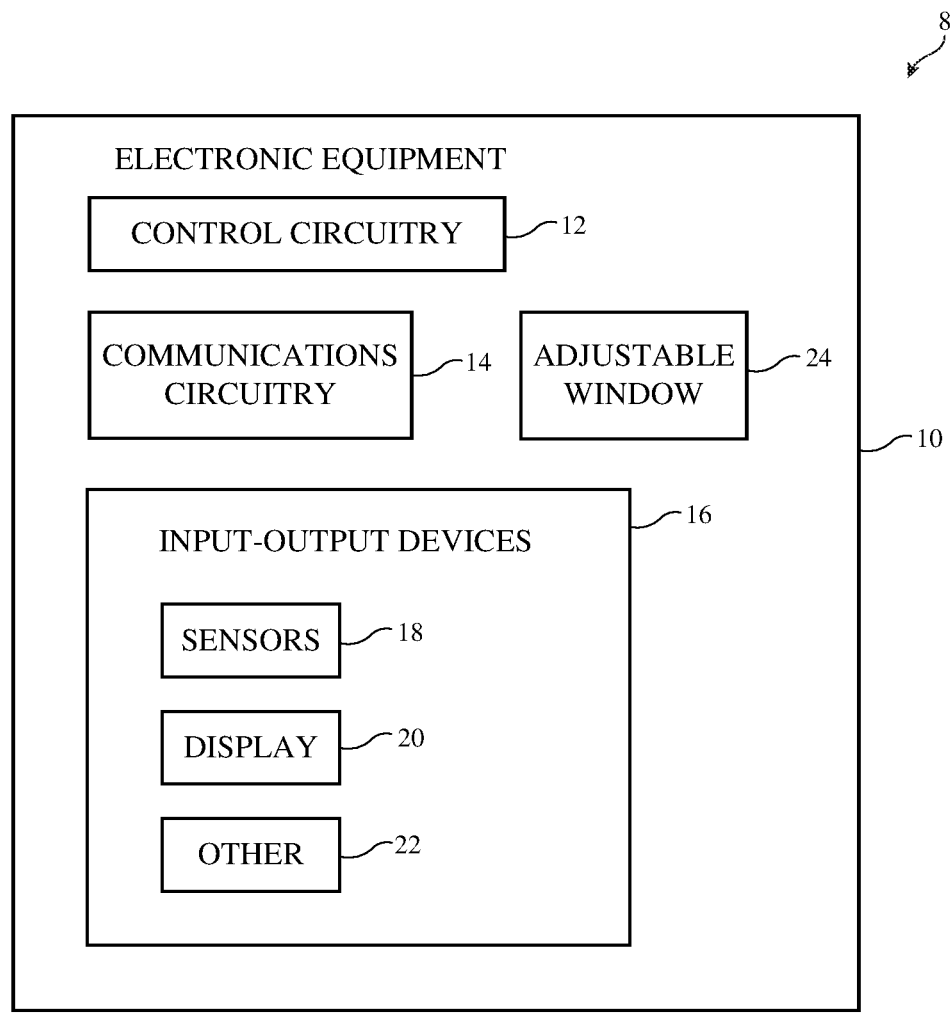
FIG. 2 is a schematic diagram of an illustrative system in accordance with an embodiment.

FIG. 2 is a schematic diagram showing illustrative components of system 8. As shown in FIG. 2, system 8 may include electronic equipment 10. Electronic equipment 10 may be supported by support structures in system 8 such as wall structures 26 and/or other supporting structures. Electronic equipment 10 may, for example, be mounted within a building, vehicle, or other system. Equipment 10 may include circuitry 12, communications circuitry 14, adjustable windows such as adjustable window 24, and input-output devices 16.

Control circuitry 12 may include storage and processing circuitry for supporting the operation of equipment 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to gather input from sensors and other input devices and may be used to control window 24 and output devices. The processing circuitry may be based on one or more microprocessors, microcontrollers, digital signal processors, baseband processors and other wireless communications circuits, power management units, audio chips, application specific integrated circuits, etc.

To support communications between device 10 and external electronic equipment, control circuitry 12 may communicate using communications circuitry 14. Communications circuitry 14 may include antennas, radio-frequency transceiver circuitry, and other wireless communications circuitry and/or wired communications circuitry. Circuitry 14, which may sometimes be referred to as control circuitry and/or control and communications circuitry, may, for example, support wireless communications using wireless local area network links, near-field communications links, cellular telephone links, millimeter wave links, and/or other wireless communications paths.

Input-output devices 16 may be used in gathering user input, in gathering information on the environment surrounding the user (e.g., the locations of objects 36 in interior region 38 and the locations of objects such as object 30 in exterior region 28), and/or in providing a user with output. Devices 16 may include sensors 18. Sensors (sensor systems) 18 may include force sensors (e.g., strain gauges, capacitive force sensors, resistive force sensors, etc.), audio sensors such as microphones, touch and/or proximity sensors such as capacitive sensors and/or other touch sensors and/or proximity sensors, optical sensors such as optical sensors that emit and detect light, ultrasonic sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), radio-frequency sensors (e.g., radar and other ranging and positioning sensors), depth sensors (e.g., structured light sensors and/or depth sensors based on stereo imaging devices that can capture three-dimensional images of objects and thereby help determine the locations of objects and/or portions of objects such as a user's eyes, head, etc.), optical sensors such as self-mixing sensors and light detection and ranging (lidar) sensors that gather time-of-flight measurements and/or other measurements to determine distance and/or relative velocity, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors.

Input-output devices 16 may also include displays such as display 20. Displays in system 8 may be organic light-emitting diode displays, displays based on arrays of light-emitting diodes formed from crystalline semiconductor dies, liquid crystal displays, electrophoretic displays, microelectromechanical systems (MEMs) displays such as displays with arrays of moving mirrors, and/or other displays.

If desired, input-output devices 16 may include other devices 22. Devices 22 may include components such as status indicator lights (e.g., light-emitting diodes that serve as power indicators, and other light-based output devices), speakers and other audio output devices, etc. Devices 22 may also include buttons, rotating buttons, push buttons, joysticks, keys such as alphanumeric keys in a keyboard or keypad, microphones for gathering voice commands, touch sensor input devices, and/or other devices for gathering user input and output components such as haptic output devices and other output components. In building systems, devices 22 may include light switches, air conditioning and heating controls, and other building controls. In vehicle systems, devices 22 and other components in system 8 may include steering controls (e.g., steering wheels, autonomous steering systems, etc.), may include internal combustion engine components, electric drive motors, heating and air conditioning systems, etc. If desired, electronic devices such as tablet computers, laptop computers, cellular telephones, wristwatches, and other portable electronic devices operated by users such as user 36-1 may be located in interior region 38 and used in system 8 (see, e.g., object 36-2 of FIG. 1).

Figure 3:
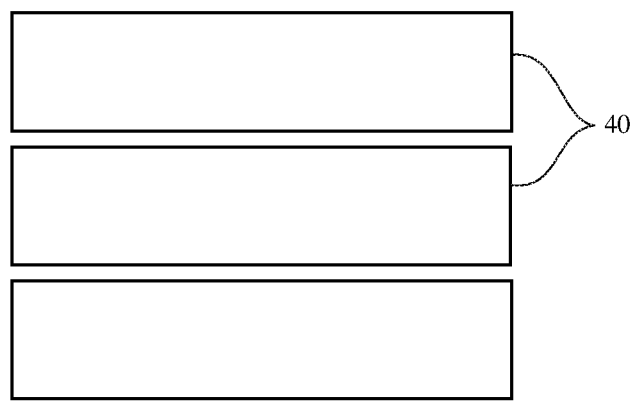
FIGS. 3 and 4 are top views of illustrative electrodes that may be used in an adjustable window in accordance with an embodiment.
Figure 4:
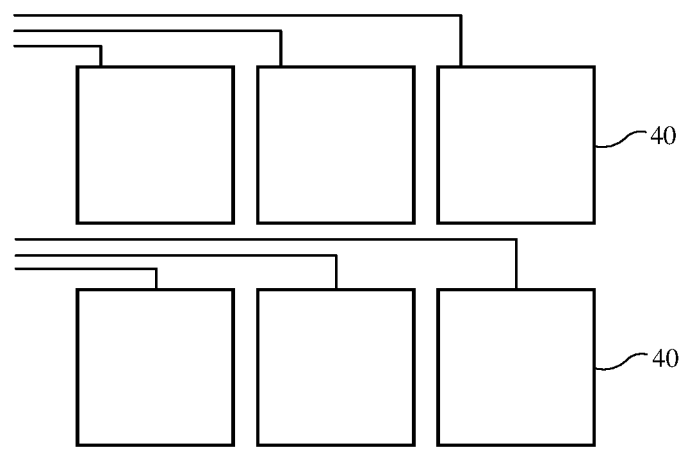

Pixels P may have any suitable shape. For example, pixels P may be square, rectangular, hexagonal, triangular, circular, or oval. If desired, pixels P may cover elongated strip-shaped regions of window 34 (e.g., pixels P may have elongated strip-shaped electrodes) and may, if desired, run horizontally or vertically across window 24. The aspect ratio (length/width) of an elongated strip-shaped pixel (and its associated electrode(s)) may be at least 5:1, at least 20:1, at least 150:1, may be less than 200:1, less than 30:1, or other suitable aspect ratio. Illustrative electrode patterns (and therefore illustrative shapes for pixel P) are shown by illustrative electrodes 40 of FIGS. 3 and 4. In the example of FIG. 3, electrodes 40 have elongated strip shapes. In the example of FIG. 4, electrodes 40 are patterned to form an array of square individually addressable electrodes. Blanket electrode layers (e.g., global ground layers, etc.) may also be included in window 24. Moreover, other electrode patterns or combinations of these patterns may be used in forming individually addressable pixels P. During operation, pixels P may be adjusted so that a single pixel of window 24 changes its state (e.g., so that a single pixel exhibits a change in light transmission or haze) or pixels P may be adjusted in groups (e.g., so that a first set of pixels P changes its light transmission or haze).

Figure 5:
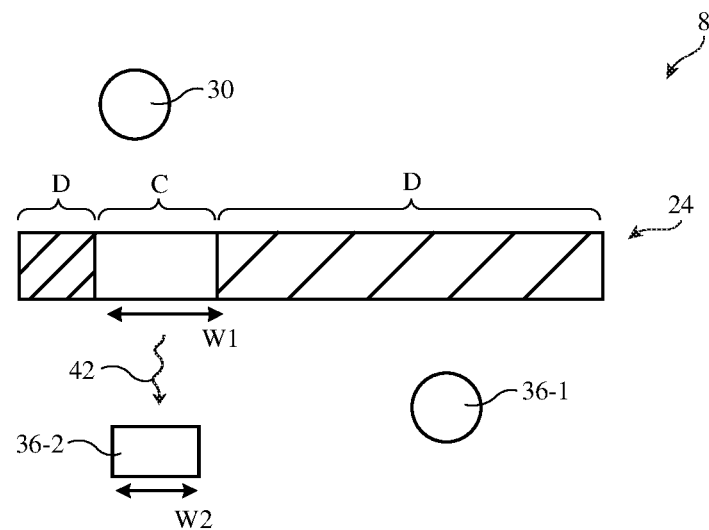
FIG. 5 is a cross-sectional view of an illustrative adjustable window with a clear portion that creates a spotlight in the interior of a system in accordance with an embodiment.

FIG. 5 is a cross-sectional side view of system 8 in an illustrative configuration in which window 24 has been configured to exhibit a clear region C that is surrounded by darker regions D (regions of lower light transmission). In an arrangement of the type shown in FIG. 5, object 30 may be the sun or other light source. The dimensions of clear area C such as lateral dimension W1 may be sufficient to cast a beam of spotlight illumination 42 from object 30 onto object 36-2. For example, the value of W1 may be at least that of lateral dimension W2 of object 36-2. Object 36-2 may be a book or other object for which external illumination from object 30 is desired. During operation, control circuitry 12 may use sensors 18 to gather information on the location of object 30 relative to wall structure 26 and to gather information on the location of objects 36 relative to wall structure 26. For example, an exterior sensor system with an image sensor or other sensor may determine the location of object 30 relative to wall structure 26 and an interior sensor system with one or more image sensor devices in a depth sensor and/or other sensors in interior region 38 may determine the location of objects 36 relative to wall structure 26.

In this way, control circuitry 12 may determine the relative positions of object 30, wall structure 26 (and therefore adjustable window 24), and objects 36. Based on this relative position information, control circuitry 12 can determine an appropriate location and size for forming clear region C and dark regions D within adjustable window 24. Once light transmission in region C is increased and light transmission in region D is decreased to desired amounts, light 42 will illuminate objet 26-2 without illuminating undesired objects such as object 36-1. For example, object 36-1 may be a vehicle occupant who is reading a book (object 26-2) and who does not desire to be illuminated by sunlight from object 30.

The light transmission of clear region C may be at least 60%, at least 80%, at least 95%, less than 99%, less than 70%, or other suitable value. The light transmission of dark region D may be less than that of region C (e.g., 30%, less than 20%, less than 5%, more than 1%, or other suitable value). If desired, an image sensor or other sensor in interior region 38 can gather user input. For example, control circuitry 12 can use sensors 18 and/or other equipment 10 to gather hand gestures, voice commands, touch input, button press input, or other input. If desired, input may be gathered by control circuitry 12 using an electronic device or accessory in communication with circuitry 12 that is serving as an intermediary input device. User input may, for example, be gathered using a tablet computer, a remote control, and/or other device that communicates wirelessly or via wired communications with control circuitry 12.

Control circuitry 12 can also use sensors 18 such as compasses (magnetic sensors), image sensor, radar, lidar, satellite navigation system receiver circuitry (e.g., Global Positioning System circuitry), clock circuitry that produces time and data information, and/or other circuitry to gather information on the operating environment for system 8. Database information (stored in circuitry 12 or accessed by circuitry 12 from an online database or other remote database) may also be used to gather information on the operating environment for system 8. For example, calendar information, information on the position of the sun at different dates and time of day, map images and other map information indicating the location and nature of scenery on roads on which system 8 is travelling (e.g., information indicating the locations of attractive objects in nature such as natural objects and indicating the locations of unattractive objects such as manmade objects), map information indicating the location (coordinates and height) of mountains and other objects that may block the sun, and other database information related to external objects 30 and exterior region 28 may be used in producing environmental information for system 8.

Using sensors 18 in interior 38 (e.g., structured light sensors and/or other depth sensors based on one or more image sensors, radio-frequency sensors and/or image sensors that measure the positions of electronic devices, temperature sensors, force sensors that measure seat pressure, and/or other sensors), control circuitry 12 may also determine the locations of objects 36 in interior 38.

User input and/or predetermined settings for system 8 may be used in determining appropriate action to take in adjusting adjustable window 24 in response to measured environmental conditions, user input, and the positions of objects 36. For example, if a user has directed control circuitry 12 to operate in a spotlight mode, control circuitry 12 can determine the location of a light source (e.g., the sun or other light source such as object 30), can determine the location of system 8, and can determine the location of objects 36. Using this information, control circuitry 12 can determine an appropriate location for region C and region D to create a beam of illumination 42. As system 8 changes position (e.g., as the orientation of system 8 relative to external region 28 changes) and/or as objects 30 and 36 move relative to system 8, the locations of regions C and D can be updated dynamically. In response to user input indicating that the position of region C should be moved (e.g., a hand gesture, voice command, or other input), control circuitry 12 can reposition region C accordingly.

Figure 6:
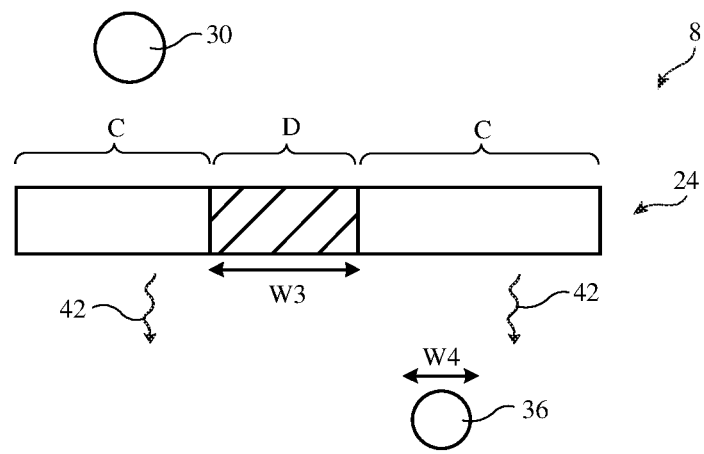
FIG. 6 is a cross-sectional view of an illustrative window with a dark portion that creates a shadow in the interior of a system in accordance with an embodiment.

In addition to or instead of spotlighting interior objects such as object 26-2 of FIG. 5, system 8 may create shadows that fall on objects 36 and/or other portions of interior 38. As shown in FIG. 6, for example, control circuitry 12 may adjust pixels P so that transparency of window 24 is higher in regions C and lower in regions D. Region D may be provided with sufficient size (e.g., a width W3 that is at least equal to width W4 of object 36), to create a shadow covering object 36 (e.g., in scenarios in which object 30 is a light source). Object 36 may, for example, a facial region, the entire body, or a portion of the body of an occupant of system 8. By blocking light from object 30, the comfort of the vehicle occupant may be enhanced. In some scenarios, the sensor in interior region 38 may identify the location of the eyes of the occupant (user) of system 8. The shadow produced by region D of FIG. 6 may then be sized and positioned appropriately to prevent glare from headlights or other external light source from reaching the user's eyes.

Less light transmissive regions (D) and more light transmissive regions (C) are show in the examples of FIGS. 5 and 6. In general, any suitable patterns may be created using pixels P (e.g., patterns with numerous D and/or numerous C regions, patterns with one or more regions of one or more intermediate levels of light transmission, gradients, animated effects such as flashing effects, etc.). In addition to and/or instead of adjusting light transmission in these regions, other optical characteristics of one or more regions of window 24 may be adjusted (e.g., haze, light reflection, light absorption, color cast, etc.).

Figure 7A:
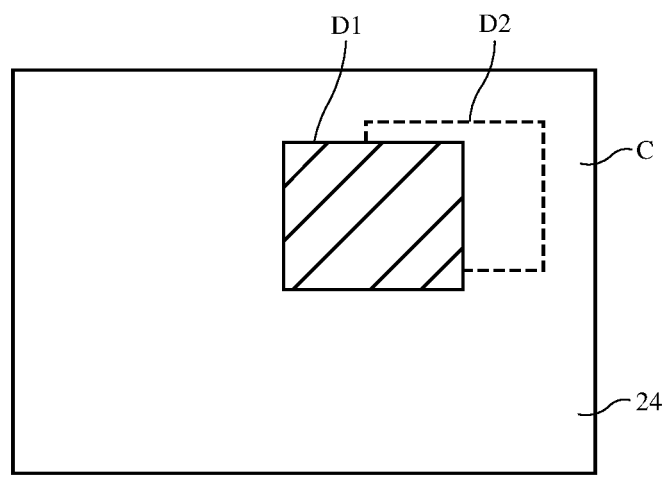
FIG. 7A is a diagram of an illustrative adjustable window with a movable darkened portion that creates a movable shadow in accordance with an embodiment.
Figure 7B:
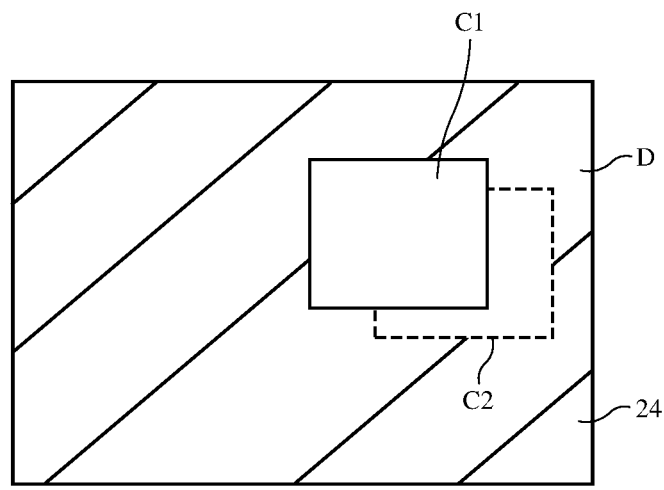
FIG. 7B is a diagram of an illustrative adjustable window with a movable clear portion that creates a movable spotlight in accordance with an embodiment.

During operation, the state of window 24 (e.g., the positions and optical characteristics of each of pixels P and/or sets of pixels P) may be adjusted dynamically. For example, a darkened region may be moved based on movement of objects and/or system 36 and/or based on user input (e.g., a movement gesture). As shown in FIG. 7A, for example, a darkened region surrounded by transparent region C may be moved dynamically from position D1 to D2. In the illustrative configuration of FIG. 7B, a transparent region surrounded by darkened region D is being moved from position C1 to position C2.

Figure 8:
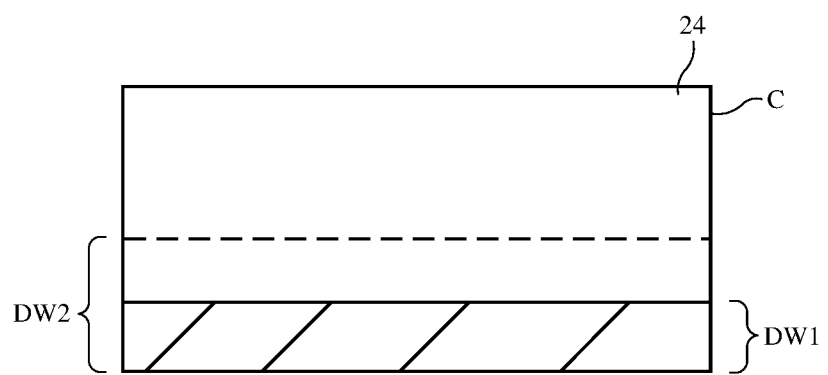
FIG. 8 is a diagram of an illustrative window with adjustable clear and dark regions in accordance with an embodiment.

FIG. 8 shows how window may be configured dynamically based on information on the surroundings of system 8. In a first operating environment such as an environment in which a portion of exterior region 28 is unattractive (e.g., region 28 has power lines and other objects that a user does not desire to observe), window 24 may be configured to exhibit a larger darkened region (see, e.g., darkened region DW2) that blocks these objects. In a second operating environment, such as an environment in which exterior region 28 is attractive (e.g., region 28 has mountains and other objects that a user desires to observe), window 24 may be configured to exhibit no darkened region or a smaller darkened region (see, e.g., darkened region DW1) and a corresponding enlarged transparent region (e.g., region C).

Control circuitry 12 can adjust the size of the darkened region based on map information (e.g., the geographic location of system 8 determined from a satellite navigation system receiver or other sensor relative to a map database tagged with attractive and unattractive labels in different areas), user-defined attractive and unattractive regions in a map database or other database, user preferences, and/or other criteria. If desired, circuitry 12 can process image sensor data from an external image sensor to identify objects that are potentially manmade and to identify objects that are potentially natural (as an example). Circuitry 12 can then adjust window 24 accordingly based on user-defined preferences (e.g., a user preference to block manmade objects from view). In general, any suitable criterial may be used to adjust window 24 based on the operating environment of system 8. For example, window 24 can be adjusted based on the location of system 8, based on the time of day, based on the location of interior and/or exterior objects relative to system 8, based on the type and/or number of occupants of system 8, based on the identification of people in exterior region 28 (e.g., darkened regions may be increased to enhance privacy and/or block an exterior person's line of view towards a system occupant, electronic device or other object 36 in interior 38), based on weather (e.g., more shading on days in which the measured ambient light level is high and/or when weather report information indicates that the weather will be sunny, etc.).

Figure 9:
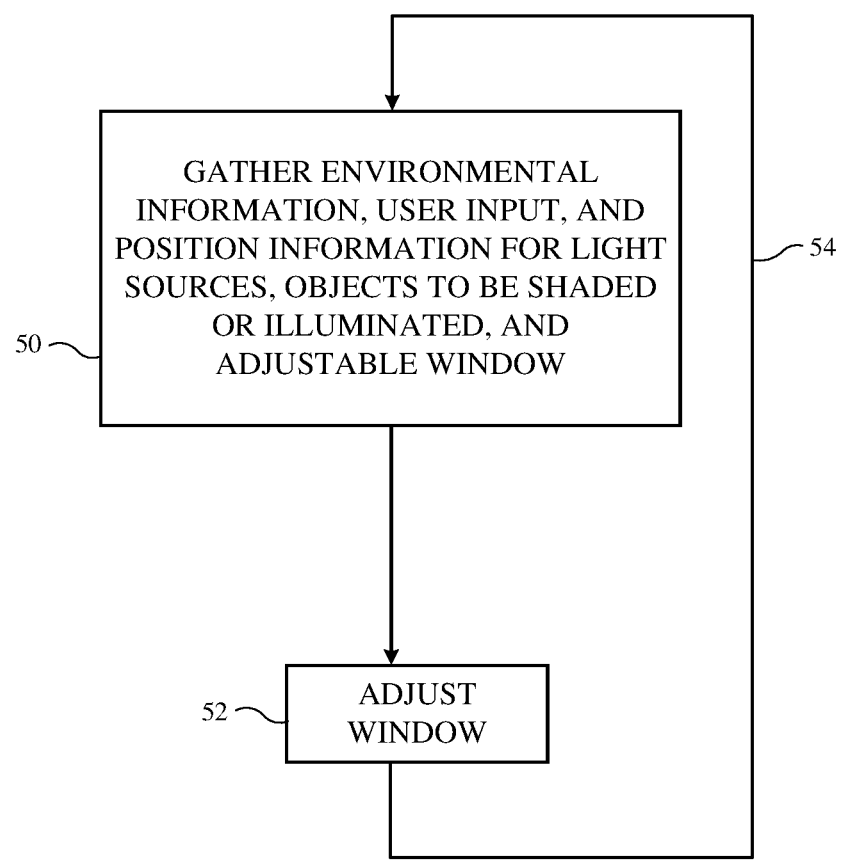
FIG. 9 is a flow chart of illustrative operations involved in operating a system with an adjustable window in accordance with an embodiment.

Illustrative operations involved in operating system 8 are shown in FIG. 9.

During the operations of bock 50, system 8 may gather user input, environmental data that serves as input for system 8, sensor input from exterior and interior sensor systems, and other input information. This information may be used in determining desired adjustments to the optical properties of each pixel P in adjustable window 24. Sensors 18 in the interior and/or exterior of system 10 (e.g., inside or outside of the system enclosure formed by wall structure 26) may be used in gathering user input and other input.

Temperature sensors may be used in gathering information on interior and/or exterior temperature. Infrared image sensors that are sensitive at long infrared wavelengths may serve as temperature sensors. Temperature sensors may, if desired, measure the skin temperatures of system occupants. If desired, online information (e.g., information from a weather database) may be used in determining the exterior temperature surrounding system 8.

Moisture sensors may gather information on rain or other moisture present in the environment. Barometric pressure sensors, gas sensors, and particulate sensors may also be used in evaluating the atmosphere in the environment surrounding system 8.

Position sensor systems may be based on accelerometers, compasses (magnetic sensors), gyroscopes, and satellite positioning system sensors and other locations (orientation) measurement circuitry. Using a position sensor, system 8 can determine the orientation of system 8 (e.g., structure 26) and its occupants relative to external light sources and other external objects.

Image sensors can capture images of the interior of system 8. Using this information or information from other internal sensors (e.g., depth sensors such as structured light sensors, proximity sensors, lidar, etc.), system 8 can monitor the locations of occupants and internal inanimate objects within system 8.

External image sensors and other external sensors (lidar, radar, etc.) may also be used in monitoring the external environment surrounding system 8. For example, external image sensors and other external sensors can be used to determine the locations of external objects 30. An image sensor may, if desired, capture images of the view surrounding system 8. Image analysis operations can then be performed on the captured image data using control circuitry (e.g., control circuitry 12). For example, objects of interest and objects that are not of interest (e.g., power lines and other potentially unsightly objects) can be automatically identified. Areas of interest may be discriminated from areas that are not of interest based on color information, texture information, pattern recognition information, and/or other suitable criteria. In addition to performing image analysis to rate the potential desirability of viewing different portions of an image, image analysis can be performed to identify people in the vicinity of system 8 (e.g., so that system 8 may, if desired, block the view of those people into the interior of system 8).

User input (e.g., commands from system occupants) can be gathered using sensors that receive voice commands (e.g., microphones), sensors that detect three-dimensional gestures such as hand gestures (e.g., depth sensors, proximity sensors, light-based sensors, capacitive sensors, acoustic sensors, image sensors, etc.), touch sensors that can detect touch input, accelerometers that can detect finger taps, force sensors that can detect finger press input, buttons and other physical switch-based controls (knobs, dials, sliding switches, etc.) that can be used to gather user switch input, a mouse, trackpad, joystick, directional buttons, remote control, or other pointing input devices that can be used to gather pointing input, and other devices that may be used in gathering user input.

Sensors and other circuitry in system 8 may gather information on the current time and date, information from a database maintained by circuitry 12 and/or retrieved via wired or wireless communications from an online databases (e.g., current and predicted traffic conditions on a road on which system 8 is traveling, current and predicted weather information, map information such as information on which stretches of highway are scenic and which are not, map information indicating points of interest, navigation system information such as information on a destination of system 8, historical information such as historical user preferences, and/or other database information).

During the operations of block 52, the information gathered during the operations of block 50 may be used in adjusting window 24. Each pixel P in window 24 may, if desired, be adjusted to exhibit a desired optical characteristic (e.g., a desired light transmission, light reflection, light absorption, haze, color, etc.). Sets of pixels P may be adjusted similarly and/or each pixel P may be configured differently. This allows desired patterns of transparency, reflectivity, light absorption, haze, and/or color to be created in window 24 as appropriate for the user input, environmental information, and other information gathered during the operations of block 50.

For example, one or more selectively darkened areas (areas of window 24 with lower light transmission) may be created in locations that create shadows that prevent sunlight or other external illumination from overly heating an occupant's skin (e.g., on the face, entire body, or portion of the body). Shadows may be created this way in response to detection of the presence of sunlight directed towards the occupant. The use of system 8 to create the shadows may be automatic (e.g., when system 8 is operating in a default shadowing mode or a user-initiated shadowing mode).

One or more selectively darkened areas may also be created to block glare from a user's eyes (e.g., without shadowing an occupant's face excessively or obscuring an occupant's view of the road on which system 8 is traveling). Glare blocking operations may take place automatically (e.g., when system 8 detects glare directed towards the eyes of an occupant while operating in a glare blocking mode initiated by a user or running by default on system 8).

Privacy can be enhanced by automatically (or in response to user input) creating selectively darkened areas that prevent an external person from viewing an occupant or a sensitive book, display, or other sensitive items in the interior of system 8. Window 24 may, for example, be darkened in a region interposed between an external viewer and an internal occupant.

In some arrangements, unsightly objects in the area surrounding system 8 may be blocked from view by an occupant of system 8. If, for example, control circuitry 12 detects the presence of power lines near system 8 (e.g., using image analysis or using database information specifying the nature of exterior region 28 as a function of the currently identified location of system 8), a portion of window 24 that is along an occupant's line of sight to the power lines may be selectively darkened to block the power lines from view. System 8 may automatically block portions of the exterior from view based on image analysis, database information, or other information identifying which portion of the exterior are potentially unsightly and therefore undesirable for viewing by the occupant.

In addition to creating darkened areas in window 24, spotlight areas (clear areas surrounded by darkened portions of window 24) may be created (e.g., to create spotlight illumination in a desired portion of interior 38).

Darkened portions of window 24 help block light. If desired, other optical characteristics can be modified based on the information gathered during block 50 (e.g., light reflection, light absorption, haze, color, etc.) in addition to or instead of creating darkened portions of window 24. For example, haze can be increased to block some but not all light, color can be adjusted (e.g., to reduce light transmission for some wavelengths of light more than others, to enhance contrast, to create colored shadows, etc.). The use of selective window area darkening is illustrative.

If desired, user input may be used to change the operating mode of system 8 (e.g., to invoke or exit a sunlight shading mode, a headlight glare blocking mode, a privacy mode, an unsightly scenery blocking mode, and/or a spotlight mode). User input may also be used to adjust operation of system 8 when the features of one or more of these modes are active. For example, hand gestures and other user input may be used to modify the location and size of a darkened or transparent region or other set of one or more pixels P that has been selectively altered from other pixels P in window 24. This allows the user to move the location of shade, to modify glare blocking operations, to create more or less privacy, to increase or decrease spotlight size and/or to move spotlight illumination, to adjust unsightly scenery blocking areas (e.g., to enlarge a blocking area or to decrease the size of a blocking area), etc. User input can be used to select which optical properties are modified during each mode. For example, a user may select whether locally enhanced haze or locally reduced light transmission is used during unsightly scenery blocking operations, may determine a desired color to switch into use when creating a spotlight region, may determine the degree of darkening and the spatial profile (sharp or graded) associated with a glare blocking region, etc.

As illustrated by line 54, the operations of FIG. 9 may be performed continually during operation of system 8. System 8 may be a vehicle traveling on a roadway, may be a train, airplane, boat, motorized road vehicle, or other movable enclosed system, may be a building (e.g., an office, home, etc.) or other stationary enclosed system, or may be any other system having walls or other structures forming a system enclosure dividing an interior region with an occupant from an exterior region.

Although sometimes described in the context of selectively adjusting visible light transmission through window 24, window 24 may, if desired, be provided with adjustable layers (e.g., adjustable liquid crystal devices, etc.) that are tuned to selectively adjust infrared light transmission (e.g., heat transmission) through window 24 in addition to or instead of adjusting visible light transmission. In this type of arrangement, selective light transmission adjustments may be made to block (or not block) portions of the interior of a vehicle or other system (e.g. to selectively heat or cool a vehicle occupant by respectively not-blocking or blocking the transmission of infrared light through a window region towards the vehicle occupant). In general, portions of window 24 may be adjusted to adjust light transmission (or other optical properties) at any suitable wavelength or range of wavelengths of interest (e.g., one or more visible light wavelengths, one or more infrared wavelengths, or one or more ultraviolet light wavelengths).

If, as an example, it is desired to warm a vehicle occupant with infrared light from the sun on a cold day, appropriate portions of one or more windows in system 8 may be adjusted to exhibit enhanced infrared light transmission so that an enhanced amount of infrared light illuminates the vehicle occupant. Visible light transmission may be adjusted (e.g., enhanced) in coordination with the selective enhancement of the infrared light transmission or, if desired, visible light transmission may be left unchanged (e.g., visible light transmission may remain in a fixed low transmission state or may remain in a fixed high transmission state in a given portion of window 24 while infrared light transmission through that given portion of window 24 is selectively enhanced). As another example, a vehicle occupant can be cooled on a hot day by selective reduction in infrared light transmission in an appropriate portion of window 24. Visible light transmission through that portion of window 24 may be adjusted (e.g., reduced) in coordination with the reduction in infrared light transmission or may remain in a fixed low or high transmission state.

The foregoing is merely illustrative and various modifications can be made to the described embodiments. The foregoing embodiments may be implemented individually or in any combination.

What is claimed is:

1. A system, comprising:
an enclosing structure configured to separate an interior region with an occupant from an exterior region;
an adjustable window in the enclosing structure that is between the interior and exterior regions;
an interior sensor system;
an exterior sensor system; and
control circuitry operable in a spotlight mode in which the control circuitry creates a movable spotlight on a location within the interior region by increasing transparency of a first region of the adjustable window relative to a second region of the adjustable window that surrounds the first region, wherein the control circuitry increases the transparency of the first region of the adjustable window based on information from the interior and exterior sensor system.

2. The system defined in claim 1 wherein the enclosing structure is configured to enclose an inanimate object within the interior region and wherein the control circuitry is configured to:
use the exterior sensor system to determine a location of a light source in the exterior region;
use the interior sensor system to determine a location of the inanimate object in the interior region;
determine a location of the adjustable window relative to the light source and relative to the inanimate object; and
adjust the adjustable window to increase the transparency of the first region based on the determined location of the adjustable window relative to the light source and relative to the inanimate object.

3. The system defined in claim 2 wherein the light source produces light and wherein the first region is located in a position that causes a portion of the light to spotlight the inanimate object.

4. The system defined in claim 3 wherein the exterior sensor system comprises an image sensor.

5. The system defined in claim 4 wherein the interior sensor system comprises an image sensor.

6. The system defined in claim 5 wherein the adjustable window comprise a pixelated guest-host liquid crystal layer.

7. The system defined in claim 6 wherein the enclosing structure comprises a vehicle body.

8. The system defined in claim 1 wherein the control circuitry is configured to gather a hand gesture from the occupant using the interior sensor system and is configured to move the first region within the adjustable window based on the hand gesture.

9. The system defined in claim 1 wherein the control circuitry is configured to gather user input from the occupant and is configured to increase the transparency of the first region based on the user input.

10. A system, comprising:
an enclosing structure configured to separate an interior region with an occupant from an exterior region;
an adjustable window in the enclosing structure between the interior and exterior regions; and
control circuitry that stores user preferences and is configured to:
identify an object in the exterior region that is undesirable to view by the occupant based on the user preferences; and
selectively decrease transparency of a first region of the adjustable window relative to a second region of the adjustable window to block the object in the exterior region from view by the occupant.

11. The system defined in claim 10 further comprising:
an image sensor in the exterior region, wherein the control circuitry is configured to analyze an image captured with the image sensor to identify the object in the exterior region.

12. The system defined in claim 10 wherein the control circuitry is configured to identify the object in the exterior region based on database information.

13. The system defined in claim 12 wherein the database information comprises map information and wherein the control circuitry is configured to identify a location of the occupant on the map.

14. The system defined in claim 10 wherein the enclosing structure comprises a vehicle body.

15. The system defined in claim 14 wherein the adjustable window is configured to exhibit an electrically adjustable optical property selected from the group consisting of: reflectivity, haze, and color.

16. The system defined in claim 14 wherein the adjustable window comprises a guest-host liquid crystal layer.

17. A system, comprising:
a vehicle body configured to separate an interior region with a vehicle occupant from an exterior region;
an adjustable window in the vehicle body between the interior and exterior regions;
an exterior sensor system;
an interior sensor system; and
control circuitry configured to:
identify a location of a light source in the exterior region using the exterior sensor system;

identify a first interior location of the occupant using the interior sensor system;

identify a second interior location of an inanimate object in the interior region using the interior sensor system; and create a spotlight on the inanimate object and a shadow on the occupant by adjusting an optical characteristic of a first region of the adjustable window relative to a second region of the adjustable window based on the location of the light source and the first and second interior locations.

18. The system defined in claim 17 wherein the control circuitry is configured to adjust the optical characteristic of the first region to decrease transparency of the first region relative to the second region.

19. The system defined in claim 17 wherein the control circuitry is configured to increase transparency of the first region relative to the second region to allow more light from the light source to reach the inanimate object at the second interior location than reaches the occupant at the first interior location.

20. The system defined in claim 19 wherein light from the light source passes through the first region to the inanimate object and wherein the second region is configured to block light from the light source to shadow the occupant.

21. A system, comprising:

a vehicle body configured to separate an interior region with a vehicle occupant from an exterior region;

an adjustable window in the vehicle body between the interior and exterior regions;

an exterior sensor system;

an interior sensor system; and control circuitry configured to:

identify a location of a light source in the exterior region using the exterior sensor system;

identify an interior location of the occupant using the interior sensor system; and adjust an optical characteristic of a first region of the adjustable window relative to a second region of the adjustable window based on the location of the light source and the interior location to selectively cool the interior location, wherein the control circuitry reduces the transmission of infrared light through the first region while transmission of visible light through the first region remains constant.

\* \* \* \* \*